US009331621B2

(12) United States Patent
Lee

(10) Patent No.: US 9,331,621 B2
(45) Date of Patent: May 3, 2016

(54) ELECTRIC POWER SAVING DEVICE FOR MOTOR OF PUMP JACKS APPARATUS

(71) Applicant: A.R.T. Korea Co., LTD, Yangsan-si (KR)

(72) Inventor: Kyung-Soon Lee, Yangsan-si (KR)

(73) Assignee: A.R.T. Korea Co., Ltd. (KR)

( * ) Notice: Subject to any disclaimer, the term of this patent is extended or adjusted under 35 U.S.C. 154(b) by 69 days.

(21) Appl. No.: 14/460,215

(22) Filed: Aug. 14, 2014

(65) Prior Publication Data

US 2015/0303854 A1 Oct. 22, 2015

(30) Foreign Application Priority Data

Apr. 22, 2014 (KR) ........................ 10-2014-0047793

(51) Int. Cl.

| | |
|---|---|
| ***H02P 1/00*** | (2006.01) |
| ***H02P 23/00*** | (2016.01) |
| ***H02P 27/06*** | (2006.01) |
| ***E21B 43/12*** | (2006.01) |
| ***E21B 47/00*** | (2012.01) |

(52) U.S. Cl.

CPC .......... *H02P 23/0036* (2013.01); *E21B 43/127* (2013.01); *E21B 47/0008* (2013.01); *H02P 23/0004* (2013.01); *H02P 27/06* (2013.01); *E21B 2043/125* (2013.01)

(58) Field of Classification Search

CPC .................................. H02J 5/005; H02J 1/102

USPC .......... 318/454, 400.04, 400.15, 400.26, 722, 318/432, 455, 492; 417/2, 4, 17, 44.1, 45

See application file for complete search history.

(56) References Cited

U.S. PATENT DOCUMENTS

| | | | | |
|---|---|---|---|---|
| 4,314,189 A * | 2/1982 | Okado | H02P 23/08 | 321/732 |
| 5,300,872 A * | 4/1994 | Endo | H02M 7/53873 | 318/802 |
| 5,883,489 A * | 3/1999 | Konrad | F04D 15/0066 | 318/805 |
| 7,504,784 B2 * | 3/2009 | Asada | D06F 37/304 | 318/400.02 |
| 7,812,557 B2 * | 10/2010 | Maekawa | D06F 37/304 | 318/400.02 |
| 2010/0244754 A1 * | 9/2010 | Marumoto | H02P 25/021 | 318/400.11 |
| 2014/0265986 A1 * | 9/2014 | Gebregergis | H02P 23/00 | 318/494 |

* cited by examiner

*Primary Examiner* — Bentsu Ro
*Assistant Examiner* — Thai Dinh
(74) *Attorney, Agent, or Firm* — Hankin Patent Law APC; Jimmy Sauz; Kevin Schraven

(57) ABSTRACT

An electric power saving device for motor of pump jack apparatus. The electric power saving device preferably detects current and voltage generated from a motor of the pump jack during the up stroke and down stroke and preferably converts the real-time load torque obtained using an AC amplifier and voltage converter. The electric power saving device preferably minimizes the counter electromotive force (Back-EMF) and preferably reduces consumption of electrical energy by automatically reducing speed in a heavy-load during an up stroke, while automatically increasing speed in un-load, during a down stroke. This is preferably done by converting real-time load torque obtained by torque formula and through the output value according to load torque in order to minimize Back-EMF.

18 Claims, 7 Drawing Sheets

↑ Up Stroke Direction

↓ Down Stroke Direction

Illustration of conventional motor rotation, current Torque, Back - EMF (Example)

Illustration of motor rotation and Back - EMF of the invention(Example)

Comparative Illustration of Pump Jack Behavior

| | | SPM/1 Cycle | Up - Stroke | Down - Stroke | Power Save(%) |
|---|---|---|---|---|---|
| Conventional | Time(sec.) | 20 | 10 | 10 | |
| | Back EMF(%) | 20 ~ 30 | 0 | 20 ~ 30 | |
| | Power Factor | 0.5 | 0.8 | 0 | |
| Invention | Time(sec.) | 20 | 7 - 8 | 13 - 12 | ≥ 21.5 |
| | Back EMF(%) | ≥ 0 | 0 | ≥ 0 | |
| | Power Factor | >0.95 | >0.99 | >0.9 | |

FIG. 5

Test Output Data

(AC 3Φ 460V 60Hz 55kw)

Conventional

Back-EMF

| | | | |
|---|---|---|---|
| | | | NOR - 7.5 |
| Output Time | | 2012-10-26 | 17:58:00 |
| Demand Start Time | | 2012-10-26 | 17:28:00 |
| Elapsed Time | | 0:30:00 | |
| INST (CIRCUITI) | | | |
| U1 482.96 V | U2 494.29 V | U3 481.97 V | Uave 486.41 V |
| I1 0.239 A | I2 0.00 A | I3 0.227 A | Iave 0.155 A |
| P 0.072 kW | Q 0.086 kvar | S 0.112 kVA | PF 0.6394 |
| F 59.973 Hz | P1 0.060 kW | P2 0.000 kW | P3 0.012 kW |
| Q1 0.025 kvar | Q2 0.00 kvar | Q3 0.062 kvar | S1 0.065 kVA |
| S2 0.00 kVA | S3 0.063 kVA | PF1 0.9427 | PF2 ------ |
| PF3 0.1876 | | | |
| AVE (CIRCUIT 1) | | | |
| U1 482.90 V | U2 493.54 V | U3 482.81 V | Uave 486.42 V |
| I1 8.127 A | I2 13.860 A | I3 13.478 A | Iave 11.822 A |
| P 6.760 kW | Q 1.554 kvar | S 6.945 kVA | PF 0.8759 |
| F 59.997 Hz | P1 1.537 kW | P2 2.563 kW | P3 2.660 kW |
| Q1 0.431 kvar | Q2 1.116 kvar | Q3 0.157 kvar | S1 1.597 kVA |
| S2 2.801 kVA | S3 2.682 kVA | PF1 0.9479 | PF2 0.886 |
| PF3 0.7585 | | | |
| MAX (CIRCUITI) | | | |
| U1 494.47 V | U2 506.54 V | U3 494.00 V | Uave 498.31 V |
| I1 33.805 A | I2 44.377 A | I3 42.897 A | Iave 40.288 A |
| P 25.415 kW | Q 6.814 kvar | S 26.100 kVA | PF 0.9991 |
| F 60.066 Hz | P1 6.854 kW | P2 9.258 kW | P3 9.478 kW |
| Q1 2.057 kvar | Q2 3.619 kvar | Q3 1.153 kvar | S1 7.109 kVA |
| S2 9.857 kVA | S3 9.508 kVA | PF1 1.0000 | PF2 1.0000 |
| PF3 1.0000 | | | |
| MIN (CIRCUITI) | | | |
| U1 467.25 V | U2 476.93 V | U3 466.83 V | Uave 470.34 V |
| I1 0.230 A | I2 0.00 A | I3 0.219 A | Iave 0.150 A |
| P 0.067 kW | Q -0.042 kvar | S 0.074 kVA | PF -1.0000 |
| F 59.905 Hz | P1 0.057 kW | P2 0.000 kW | P3 0.010 kW |
| Q1 -0.116 kvar | Q2 0.00 kvar | Q3 -0.421 kvar | S1 0.061 kVA |
| S2 0.00 kVA | S3 0.012 kVA | PF1 -1.0000 | PF2 0.0530 |
| PF3 -1.000 | | | |
| INTEGRATE (CIRCUITI) | | | |
| WP+ 3.3801 kWh | WP- -0.0000 kWh | WQ+ 0.7768 kvarh | WQ- -0.0000 kvarh |
| INTERVAL (CIRCUITI) | | | |
| WP+ 3.3801 kWh | WP- -0.0000 kWh | WQ+ 0.7768 kvarh | WQ- -0.0000 kvarh |
| DEMAND (CIRCUITI) | | | |
| P 6.760 kW | Q 1.554 kvar | PF 0.9746 | |
| Pmax 6.760 kW | Date 2012/10/26 | Time 17:58:00 | |

With Art Saver
SPM: 7.5
kWh: 6.760
kvar: 1.554
PF: 0.9746

After improvement

Back-EMF

| | | | |
|---|---|---|---|
| | | | NOR - 7.02 |
| Output Time | | 2012-10-26 | 17:10:00 |
| Demand Start Time | | 2012-10-26 | 16:10:00 |
| Elapsed Time | | 1:00:00 | |
| INST (CIRCUITI) | | | |
| U1 472.25 V | U2 481.90 V | U3 472.64 V | Uave 475.60 V |
| I1 21.856 A | I2 31.813 A | I3 30.877 A | Iave 28.182 A |
| P 16.682 kW | Q 3.859 kvar | S 17.122 kVA | PF 0.9743 |
| F 60.033 Hz | P1 4.184 kW | P2 6.146 kW | P3 6.352 kW |
| Q1 1.160 kvar | Q2 2.378 kvar | Q3 0.320 kvar | S1 4.342 kVA |
| S2 6.590 kVA | S3 6.360 kVA | PF1 0.9636 | PF2 0.9326 |
| PF3 0.9987 | | | |
| AVE (CIRCUIT I) | | | |
| U1 478.05 V | U2 488.28 V | U3 477.67 V | Uave 481.33 V |
| I1 7.394 A | I2 13.027 A | I3 12.645 A | Iave 11.022 A |
| P 6.139 kW | Q 1.372 kvar | S 6.298 kVA | PF 0.8856 |
| F 59.999 Hz | P1 1.364 kW | P2 2.348 kW | P3 2.427 kW |
| Q1 0.382 kvar | Q2 1.027 kvar | Q3 -0.146 kvar | S1 1.417 kVA |
| S2 2.568 kVA | S3 2.447 kVA | PF1 0.9501 | PF2 0.8898 |
| PF3 -0.7764 | | | |
| MAX (CIRCUITI) | | | |
| U1 488.90 V | U2 500.25 V | U3 488.13 V | Uave 492.38 V |
| I1 31.246 A | I2 41.929 A | I3 39.770 A | Iave 37.563 A |
| P 23.120 kW | Q 5.981 kvar | S 23.683 kVA | PF 0.9930 |
| F 60.111 Hz | P1 6.140 kW | P2 8.602 kW | P3 8.604 kW |
| Q1 1.850 kvar | Q2 3.286 kvar | Q3 0.943 kvar | S1 6.406 kVA |
| S2 9.205 kVA | S3 8.606 kVA | PF1 1.0000 | PF2 0.9999 |
| PF3 1.0000 | | | |
| MIN (CIRCUITI) | | | |
| U1 463.98 V | U2 473.35 V | U3 463.35 V | Uave 467.18 V |
| I1 0.221 A | I2 0.00 A | I3 0.211 A | Iave 0.144 A |
| P 0.064 kW | Q 0.051 kvar | S 0.095 kVA | PF 0.5073 |
| F 59.874 Hz | P1 0.054 kW | P2 0.000 kW | P3 0.010 kW |
| Q1 -0.095 kvar | Q2 0.00 kvar | Q3 -0.535 kvar | S1 0.058 kVA |
| S2 0.00 kVA | S3 0.027 kVA | PF1 -1.0000 | PF2 0.1520 |
| PF3 -1.0000 | | | |
| INTEGRATE (CIRCUITI) | | | |
| WP+ 6.1391 kWh | WP- -0.0000 kWh | WQ+ 1.3722 kvarh | WQ- -0.0000 kvarh |
| INTERVAL (CIRCUITI) | | | |
| WP+ 6.1391 kWh | WP- -0.0000 kWh | WQ+ 1.3722 kvarh | WQ- -0.0000 kvarh |
| DEMAND (CIRCUITI) | | | |
| P 6.139 kW | Q 1.372 kvar | PF 0.9759 | |
| Pmax 6.139 kW | Date 2012/10/26 | Time 17:10:00 | |

With Art Saver
SPM: 7.02
kWh: 6.139
kvar: 1.372
PF: 0.9759

FIG. 6

Test Confirmed Sheet, Texas, U.S.

(AC 3Φ 460V 60Hz 30kw)

Conventional

| | | | |
|---|---|---|---|
| | | By-Pess 8.26 | |
| Output Time | | 2012-10-26 | 13:47:00 |
| Demand Start Time | | 2012-10-26 | 12:47:00 |
| Elapsed Time | | 1:00:00 | |
| INST (CIRCUIT1) | | | |
| U1 476.41 V | U2 486.09 V | U3 474.89 V | Uave 479.13 V |
| I1 16.112 A | I2 19.052 A | I3 18.296 A | Iave 17.820 A |
| P -0.308 kW | Q 14.754 kvar | S 14.757 kVA | PF 0.0209 |
| F 60.021 Hz | P1 -0.205 kW | P2 -0.393 kW | P3 0.290 kW |
| Q1 4.376 kvar | Q2 5.295kvar | Q3 5.083 kvar | S1 4.380 kVA |
| S2 5.309 kVA | S3 5.092 kVA | PF1 0.0469 | PF2 0.0740 |
| PF3 0.0570 | | | |
| AVE (CIRCUIT 1) | | | |
| U1 477.80 V | U2 487.28 V | U3 476.46 V | Uave 480.51 V |
| I1 22.817 A | I2 26.776 A | I3 26.986 A | Iave 25.526 A |
| P 7.468 kW | Q 17.014 kvar | S 21.137 kVA | PF 0.4789 |
| F 60.000 Hz | P1 2.174 kW | P2 2.032 kW | P3 3.262 kW |
| Q1 4.791 kvar | Q2 6.341 kvar | Q3 5.882 kvar | S1 6.212 kVA |
| S2 7.478 kVA | S3 7.510 kVA | PF1 0.5172 | PF2 0.4301 |
| PF3 0.4923 | | | |
| → MAX (CIRCUIT1) | | | |
| U1 490.57 V | U2 500.33 V | U3 488.95 V | Uave 493.13 V |
| I1 46.126 A | I2 49.130 A | I3 52.625 A | Iave 49.271 A |
| **Back-EMF** P 33.810 kW | Q 22.595 kvar | S 40.225 kVA | PF 0.8447 |
| F 60.085 Hz | P1 10.693 kW | P2 10.831 kW | P3 12.286 kW |
| Q1 6.415 kvar | Q2 8.395 kvar | Q3 7.822 kvar | S1 12.322 kVA |
| S2 13.494 kVA | S3 14.483 kVA | PF1 0.8723 | PF2 0.8064 |
| PF3 0.8546 | | | |
| MIN (CIRCUIT1) | | | |
| U1 461.71 V | U2 470.39 V | U3 460.29 V | Uave 464.13 V |
| I1 15.249 A | I2 17.080 A | I3 16.660 A | Iave 16.340 A |
| P -17.635 kW | Q 13.403 kvar | S 13.405 kVA | PF 0.0000 |
| F 59.916 Hz | P1 -6.212 kW | P2 -6.493 kW | P3 -4.934 kW |
| Q1 4.082 kvar | Q2 4.706 kvar | Q3 4.615 kvar | S1 4.086 kVA |
| S2 4.712 kVA | S3 4.620 kVA | PF1 0.0000 | PF2 0.0000 |
| PF3 0.0000 | | | |
| INTEGRATE (CIRCUIT1) | | | |
| WP+ 9.3489 kWh | WP- -1.8811 kWh | WQ+ 17.0135 kvarh | WQ- -0.0000 kvarh |
| INTERVAL (CIRCUIT1) | | | |
| WP+ 9.3489 kWh | WP- -1.8811 kWh | WQ+ 17.0135 kvarh | WQ- -0.0000 kvarh |
| DEMAND (CIRCUIT1) | | | |
| P 9.349 kW | Q 17.014 kvar | PF 0.4816 | |
| Pmax 9.349 kW | Date 2012/10/26 | Time 13:47:00 | |

Bypass Mode (Without Art Saver)
SPM: 8.26
kWh: 9.349
kvar: 17.014
PF: 0.4816

After improvement

| | | | |
|---|---|---|---|
| | | | NOR - 8.09 |
| Output Time | | 2012-10-26 | 18:37:00 |
| Demand Start Time | | 2012-10-26 | 18:07:00 |
| Elapsed Time | | 1:00:00 | |
| INST (CIRCUIT1) | | | |
| U1 482.01 V | U2 492.66 V | U3 482.23 V | Uave 485.63 V |
| I1 6.490 A | I2 14.927 A | I3 14.541 A | Iave 11.986 A |
| P 6.134 kW | Q 1.441 kvar | S 6.301 kVA | PF 0.9735 |
| F 60.011 Hz | P1 1.086 kW | P2 2.432 kW | P3 2.617 kW |
| Q1 0.323 kvar | Q2 1.317 kvar | Q3 -0.199 kvar | S1 1.133 kVA |
| S2 2.765 kVA | S3 2.624 kVA | PF1 0.9585 | PF2 0.8794 |
| PF3 -0.9971 | | | |
| AVE (CIRCUIT 1) | | | |
| U1 478.84 V | U2 489.45 V | U3 478.69 V | Uave 482.32 V |
| I1 8.987 A | I2 14.866 A | I3 14.447 A | Iave 12.767 A |
| P 7.337 kW | Q 1.693 kvar | S 7.537 kVA | PF 0.8786 |
| F 59.999 Hz | P1 1.701 kW | P2 2.767 kW | P3 2.869 kW |
| Q1 0.474 kvar | Q2 1.184 kvar | Q3 0.172 kvar | S1 1.767 kVA |
| → S2 3.014 kVA | S3 2.890 kVA | PF1 0.9490 | PF2 0.8949 |
| PF3 0.7605 | | | |
| MAX (CIRCUIT1) | | | |
| **Back-EMF** U1 487.79 V | U2 499.42 V | U3 487.21 V | Uave 491.38 V |
| I1 38.420 A | I2 50.553 A | I3 49.036 A | Iave 46.003 A |
| P 30.085 kW | Q 7.511 kvar | S 30.825 kVA | PF 0.9879 |
| F 60.127 Hz | P1 8.034 kW | P2 10.741 kW | P3 11.310 kW |
| Q1 2.250 kvar | Q2 4.052 kvar | Q3 1.280 kvar | S1 8.244 kVA |
| S2 11.436 kVA | S3 11.350 kVA | PF1 0.9969 | PF2 0.9997 |
| PF3 1.0000 | | | |
| MIN (CIRCUIT1) | | | |
| U1 465.09 V | U2 474.26 V | U3 464.93 V | Uave 468.21 V |
| I1 0.228 A | I2 0.00 A | I3 0.217 A | Iave 0.148 A |
| P 0.067 kW | Q 0.075 kvar | S 0.106 kVA | PF 0.5849 |
| F 59.836 Hz | P1 0.056 kW | P2 0.000 kW | P3 0.011 kW |
| Q1 0.019 kvar | Q2 -0.66 kvar | Q3 -0.460 kvar | S1 0.061 kVA |
| S2 0.000 kVA | S3 0.059 kVA | PF1 0.2813 | PF2 -0.9999 |
| PF3 -1.0000 | | | |
| INTEGRATE (CIRCUIT1) | | | |
| WP+ 3.6684 kWh | WP- -0.0000 kWh | WQ+ 0.8464 kvarh | WQ- -0.0000 kvarh |
| INTERVAL (CIRCUIT1) | | | |
| WP+ 3.6684 kWh | WP- -0.0000 kWh | WQ+ 0.8464 kvarh | WQ- -0.0000 kvarh |
| DEMAND (CIRCUIT1) | | | |
| P 7.337 kW | Q 1.693 kvar | PF 0.9744 | |
| Pmax 7.337 kW | Date 2012/10/26 | Time 18:37:00 | |

With Art Saver
SPM: 8.09
kWh: 7.337
kvar: 1.693
PF: 0.9744

FIG. 7

ELECTRIC POWER SAVING DEVICE FOR MOTOR OF PUMP JACKS APPARATUS

CROSS-REFERENCE TO RELATED APPLICATIONS

This Application claims the benefit of Korean Patent Application No. 10-2014-0047793, filed on Apr. 22, 2014, titled "Petroleum Extractor Electrical Consumption Savings Device", by inventor Kyung-Soon Lee, the contents of which are expressly incorporated herein by this reference as though set forth in their entirety, and to which priority is claimed.

FIELD OF USE

The present disclosure relates generally to power saving devices for resource mining systems. More specifically, the present disclosure relates to electric power saving devices for motor of pump jack apparatus.

BACKGROUND

With the growing human population and the rapid consumption of natural resources, resources buried deep beneath the ground or on the seabed are essential for the human race. In order to tap these resources, a variety of diggers have been used. One example of a digger is a pump jack for oil field and natural gas excavation, which is preferably used by oil companies for producing oil. The pump jack is also popular among non-oil producing companies for extracting resources from the land or sea. Due to its popularity, numerous pump jack facilities have increased rapidly over the years, as shown by the two million units, which have been used and distributed by oil-producing nations.

In order to preserve its power, these pump jack systems have generally utilize various regeneration devices and pump jack reduction gears to alter its speed and or send back an electromotive force (EMF) to the power source. For example, some pump jacks were developed to utilize a hydraulic or air system. Unfortunately, the prices of those pump jacks are extremely high, and problems typically occurred relating to installation and replacement. Additionally, the low level of electrical energy savings generally slows the return of investment (ROI), which may further exacerbate the already numerous installation problems and difficulties.

Therefore, what is needed is a new and improved electric saving device for a pump jack or pump jack system. Preferably, the electric saving device will effectively regulate and control the amount of power used for that motor of pump jack apparatus.

SUMMARY

To minimize the limitations in the prior and to minimize other limitations that will become apparent upon reading and understanding the present specification, the following discloses a new and improved electric power saving device for motor of pump jack apparatus.

One embodiment may be an electric power saving device for motor of pump jack apparatus, comprising a current detector, current amplifier and voltage converter, a voltage-current converter and an inverter wherein the current detector is coupled between a motor of a pump jack and the current amplifier and voltage converter, wherein the current amplifier and voltage converter is coupled between the current detector and the voltage-current converter wherein, the voltage-current converter is coupled between the current amplifier and voltage converter and the inverter and wherein the inverter is coupled between the voltage-current converter and the motor of the pump jack. The electric power saving device may reduce a speed of the motor during an up stroke of the pump jack and may increase the speed of the motor during a down stroke of the pump jack based on a torque formula. The electric power saving device may comprise an error detection circuit, wherein the error detection circuit may be coupled to the current amplifier and voltage converter and the voltage-current converter and may be configured to detect a fault in the current amplifier and voltage converter and the voltage-current converter wherein the fault may occur when the current amplifier and voltage converter does not function properly and wherein the fault may occur when the voltage-current converter does not function properly. The electric power saving device may further comprise a bypass circuit, wherein when the error detection circuit detects the fault, the bypass circuit may block an input current from the inverter to the motor and may directly couple a power supply of the pump jack to the motor. The error detection circuit may be configured to detect an error in the current amplifier and voltage converter and the voltage-current converter, wherein the error detection circuit may couple the inverter to the motor and may allow a portion of the input current to enter the motor. The electric power saving device may comprise a constant voltage regulator and a voltage regulator, wherein the constant voltage regulator may be coupled between an input voltage and the regulator and wherein the regulator may be coupled between the constant voltage regulator and the current amplifier and voltage converter. The regulator may be coupled between the constant voltage regulator and the voltage-current converter. The input voltage may be an AC voltage wherein the constant voltage regulator may convert the AC voltage to a first DC voltage and a second DC voltage. The regulator may convert the first DC voltage to a first negative DC voltage and wherein the first negative DC voltage may be inputted to the current amplifier and voltage converter. The regulator may convert the second DC voltage to a second negative DC voltage and wherein the second negative DC voltage may be inputted to the voltage-current converter.

Another embodiment may be an electric power saving device for motor of pump jack apparatus, comprising current detector current amplifier and voltage converter voltage-current converter an inverter and a converter wherein the current detector is coupled between a motor of a pump jack and the current amplifier and voltage converter, wherein the current amplifier and voltage converter is coupled between the current detector and the voltage-current converter, wherein the voltage-current converter is coupled between the current amplifier and voltage converter and the inverter, wherein the inverter is coupled between the voltage-current converter and the motor of the pump jack and wherein the converter is coupled between the inverter and the voltage-current converter. The electric power saving device may reduce a speed of the motor during an up stroke of the pump jack and may increase the speed of the motor during a down stroke of the pump jack based on a torque formula. The electric power saving device may comprise an error detection circuit, wherein the error detection circuit may be coupled to the current amplifier and voltage converter and the voltage-current converter and may be configured to detect a fault in the current amplifier and voltage converter and the voltage-current converter, wherein the fault may occur when the current amplifier and voltage converter does not function properly and wherein the fault may occur when the voltage-current converter does not function properly. The electric power saving device may further comprise a bypass circuit, wherein when the error detection circuit detects the fault, the bypass circuit may block an input current from the inverter to the motor and may directly couple a power supply of the pump jack to the motor. The error detection circuit may be configured to detect an error in the current amplifier and voltage converter and the voltage-current converter, wherein the error detection circuit may couple the inverter to the motor and may allow a portion of the input current to enter the motor. The electric power saving device may comprise a constant voltage regulator and a voltage regulator, wherein the constant voltage regulator may be coupled between an input voltage and the regulator and wherein the regulator may be coupled between the constant voltage regulator and the current amplifier and voltage converter. The regulator may be coupled between the constant voltage regulator and the voltage-current converter. The regulator may convert the first DC voltage to a first negative DC voltage and wherein the first negative DC voltage may be inputted to the current amplifier and voltage converter. The regulator may convert the second DC voltage to a second negative DC voltage and wherein the second negative DC voltage may be inputted to the voltage-current converter.

Another embodiment may be an electric power saving device for pump jacks and motor of pump jack apparatus, comprising a current detector current amplifier and voltage converter voltage-current converter and an inverter, an error detection circuit, bypass circuit, constant voltage regulator, a voltage regulator wherein the current detector is coupled between a motor of a pump jack and the current amplifier and voltage converter, wherein the current amplifier and voltage converter is coupled between the current detector and the voltage-current converter, wherein the voltage-current converter is coupled between the current amplifier and voltage converter and the inverter, wherein the inverter is coupled between the voltage-current converter and the motor of the pump jack, wherein the error detection circuit is coupled to the current amplifier and voltage converter and the voltage-current converter and is configured to detect a fault in the current amplifier and voltage converter and the voltage-current converter, wherein the fault occurs when the current amplifier and voltage converter does not function properly, wherein the fault occurs when the voltage-current converter does not function properly, wherein when the error detection circuit detects the fault, the bypass circuit blocks an input current from the inverter to the motor and directly couples a power supply of the pump jack to the motor, wherein the error detection circuit is configured to detect an error in the current amplifier and voltage converter and the voltage-current converter, wherein the error detection circuit couples the inverter to the motor and allows a portion of the input current to enter the motor, wherein the constant voltage regulator is coupled between an input voltage and the regulator, wherein the regulator is coupled between the constant voltage regulator and the current amplifier and voltage converter, wherein the regulator is coupled between the constant voltage regulator and the voltage-current converter, wherein the input voltage is an AC voltage, wherein the constant voltage regulator converts the AC voltage to a first DC voltage and a second DC voltage, wherein the regulator converts the first DC voltage to a first negative DC voltage, wherein the first negative DC voltage is inputted to the current amplifier and voltage converter, wherein the regulator converts the second DC voltage to a second negative DC voltage, wherein the second negative DC voltage is inputted to the voltage-current converter, wherein a current output of the voltage-current converter is between approximately 4-20 mA and wherein the electric power saving device reduces a speed of the motor during an up stroke of the pump jack and increases the speed of the motor during a down stroke of the pump jack based on a torque formula.

It is an object to provide a new and improved electric power saving device for pump jacks. The electric power saving device preferably: (1) detects load power (which changes in real time); (2) uses a conversion using DC; and (3) provides a connection to the analog input terminal (approximately between 4-20 mA) of the inverter to ensure that there is no change in all manufacturing process cycles (SPM).

It is another object to provide an electric power saving device that reduces power consumption in slow movement during up stroke or heavy load.

It is another object to increase the number of revolutions more than the revolutions per minute (RPM) of a motor due to the weight of a counter weight during the down stroke or unload, thereby causing counter-electromotive force (i.e., Back EMF). Thus, the electric power saving device preferably provides power to automatically increase the frequency up to the limited speed in order to minimize Back EMF from an unload to approximately "0".

It is another object to provide an electric power saving device for pump jacks that detects current and voltage generation from a motor during the up stroke and down stroke of the pump jack and converts the real-time load torque obtained from:

$$T = \frac{K\sqrt{3}\cdot E\cdot I\cdot \cos\oint}{N}$$

in (kg*m) using an AC amplifier and voltage converter. Preferably, the electric power saving device is then connected to the "Electrical Energy Saving Device by Main Current Detection, Analysis, and Regression Using Inverter" that is disclosed in Korean Patent Application No. 10-0862579, filed by Kyung-Soon Lee, the same inventor of the present disclosure, the contents of which are expressly incorporated herein by this reference as though set forth in its entirety. The electric power saving device preferably reverses an output to a direct current of approximately 20-40 mA by the voltage-current converter in order to provide approximately 4-20 mA to an analog terminal of the inverter. This will preferably minimize Back EMF by automatically reducing the speed in heavy load or up strokes and automatically increasing the speed in unload or down strokes. Furthermore, a single cycle (SPM) device is preferably incorporated to reduce consumption of electrical energy by remaining operationally constant without change.

It is an object to provide electric power saving device for pump jacks that detects load power, which generally changes in real-time. The electric power saving device preferably utilizes Direct Current (DC) and a connection to the analog input terminal (approximately 4-20 mA) of an inverter to ensure there is no change in the manufacturing process cycles (SPM) by preferably decreasing frequency if current increases during the up stroke of the pump jacks, while decreasing frequency when the current is low during the down stroke.

It is an object to increase oil production by reducing the amount of air bubbles in the hole pump and bucket at the bottom of the polished rod.

It is an object to reduce of purchase and installation expenses for the control systems of pump jacks.

It is an object of the new apparatus to avoid the limitations of the prior art.

Other features and advantages that are inherent in the electric power saving device for motor of pump jack apparatus claimed and disclosed will become apparent to those skilled in the art from the following detailed description and its accompanying drawings.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

FIG. 5 is a table showing the comparison of the mechanical behavior between a standard pump jack and an embodiment of the pump jack with the electric saving device.

FIG. 6 is an illustration of the output test data that was acquired when testing one embodiment of the pump jack with the electric power saving device.

FIG. 7 is another illustration of the output test data that was acquired when testing one embodiment of the pump jack with the electric power saving device.

DETAILED DESCRIPTION OF THE ILLUSTRATIVE EMBODIMENTS

Figure 1:
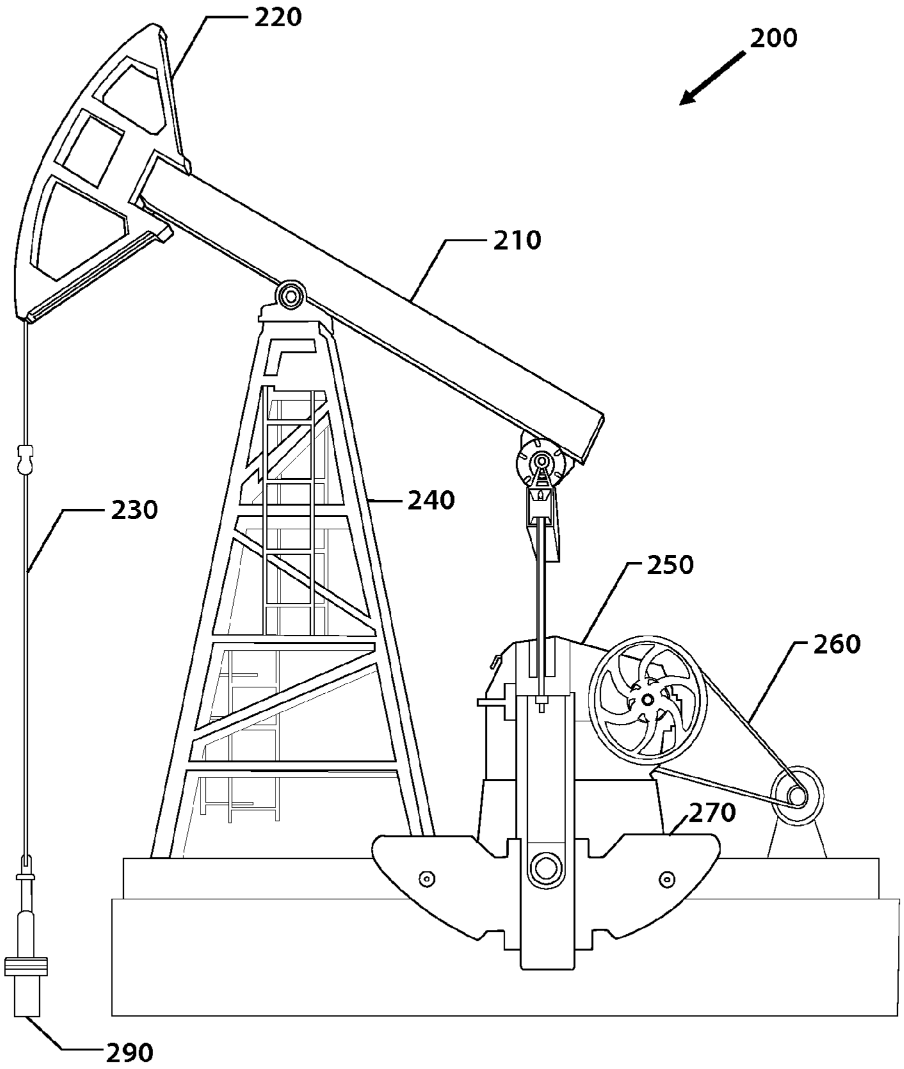
FIG. 1 is an illustration of one embodiment of a pump jack with the electric saving device.

In the following detailed description, numerous specific details are set forth in order to provide a thorough understanding of various aspects of one or more embodiments of the disclosure. However, the one or more embodiments may be practiced without some or all of these specific details. In other instances, well-known methods, procedures, and/or components have not been described in detail so as not to unnecessarily obscure aspects of embodiments.

While multiple embodiments are disclosed, other embodiments may become apparent to those skilled in the art from the following detailed description. As will be realized, the following is capable of modifications in various obvious aspects, all without departing from the spirit and scope of the disclosure. Accordingly, the graphs, figures, and the detailed descriptions thereof, are to be regarded as illustrative in nature and not restrictive. Also, the reference or non-reference to a particular embodiment shall not be interpreted to limit the scope of protection.

Before the following is disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In the following description, certain terminology is used to describe certain features of one or more embodiments. For example, the terms "pump jack" and "pump jack systems" generally refer to any over ground drive for a reciprocating piston pump used to mechanically lift liquid out of a well such as a mineral well. Typically, a pump jack converts the rotary mechanism of the motor to a vertical reciprocating motion to drive the pump shaft, and is generally exhibited in the characteristic nodding motion.

The terms "torque formula" and "torque algorithm" generally refer to the equation or algorithm for converting real-time load torque, which can be obtained from the following:

$$T = \frac{K\sqrt{3}\cdot E\cdot I\cdot\cos\phi}{N}$$

The torque formula is preferably used to automatically reduce speed during a heavy load or up stroke of a pump jack and automatically increase speed during an unload or down stroke of the pump jack. This formula preferably helps minimize counter electromotive force (i.e., Back EMF) and maintain the same single cycle (SPM) without change.

The present specification discloses a new and improved electric power saving device for pump jacks. The electric power saving device preferably: (1) detects load power (which changes in real time); (2) uses a conversion from a DC; and (3) provides a connection to the analog input terminal (approximately between 4-20 mA) of the inverter to ensure that there is no change in all manufacturing process cycles (SPM). The electric power saving device preferably ensures that there is no change in the manufacturing process cycles by decreasing the frequency in the event that current increases during up stroke of the pump jack, while decreasing frequency when current is low during down stroke of the pump jack. The electric power saving device also preferably detects load power, which generally changes in real-time by using an "Electrical Energy Saving Device by Main Current Detection, Analysis, and Regression using Inverter" as disclosed in Korean Patent Application No. 10-0862579, filed by Kyung-Soon Lee, the same inventor of the present disclosure, the contents of which are expressly incorporated herein by this reference as though set forth in its entirety.

Another purpose of the electric power saving device is to reduce power consumption in slow movement during up stroke or heavy-load. Also, the number of revolutions preferably increases more than the revolutions per minute (RPM) of a motor due to the weight of a counter weight during the down stroke or un-load, thereby resulting with counter electromotive force (i.e., Back EMF). Thus, the electric power saving device for oil well diggers and pump jacks are provided to automatically increase frequency up to the limited speed in order to minimize back EMF from an un-load to approximately "0".

In order to achieve the purpose, the electric power saving device preferably automatically reduces speed in up stroke or heavy loads, while automatically increasing speed in the un-load or down strokes by converting real-time load torque obtained by torque formula:

$$T = \frac{K\sqrt{3}\cdot E\cdot I\cdot\cos\phi}{N}$$

and through the output value according to the load torque in order to minimize Back-EMF and maintain the same single cycle (SPM) without change.

The electric power saving device generally has dual effects: (1) one that achieves an electric power saving effect by slowing down speed during up stroke (heavy-load), during the single cycle (one SPM) of the Pump jack; and (2) the other, increasing oil production by reducing the amount of air bubbles in the hole pump and bucket at the bottom of the polished rod.

Furthermore, the power consumption of the motor that runs the pump jack may be reduced significantly, and may also automatically minimize Back EMF, offering various effects, such as reduction of purchase and installation expenses for control systems.

FIG. 1 is an illustration of one embodiment of a pump jack with the electric saving device. As shown in FIG. 1, one embodiment of a pump jack 200 with the electric power saving device 100 may comprise: a walking beam 210, hose head 220, polished rod 230, Samson post 240, reduction gear 250, V-belt 260, and counterweight 270. FIG. 1 shows that the primary power source of the pump jack 200 may be delivered to the reduction gear 250 through the V-belt 260. Moreover, an induction electric motor 1, shown in FIGS. 2 and 3, may drive the walking beam 210 to pump up resources by moving the hose head 220 in an up and down fashion. In the process, the counter weight 270 generally maintains weight equilibrium with the hose head 220 to ensure the hose head 220 can achieve constant operation. At the bottom of the polished rod 230 is typically a hole pump 290, which may have one or more valves that allow reservoir fluid to enters.

During an up stroke of the pump jack 200, the travel valve generally closes and the standing valves typically open (due to the drop in pressure in the pump barrel). Consequently, the pump barrel preferably fills with fluid resources, as the traveling piston lifts the previous contents of the barrel upwards. As the rods begin pushing down, the traveling valve preferably opens and the standing valve preferably closes (due to an increase in pressure in the pump barrel). The traveling valve then preferably drops through the fluid in the barrel (which had been sucked in during the upstroke). The piston then generally reaches at the end of its stroke and begins its path upwards again, repeating the process.

The pump jack 200 may be mounted with an induction electric motor 1 for movement of the pump jack 200 and may be supplied by a 3-phase current power through the cables of the power system. The 3-phase power may then be fed through the induction electric motor 1 and to the inverter 2. As such, a lift may be located in a structure that generates regression power in the event the pump jack 200 descends.

Figure 2:
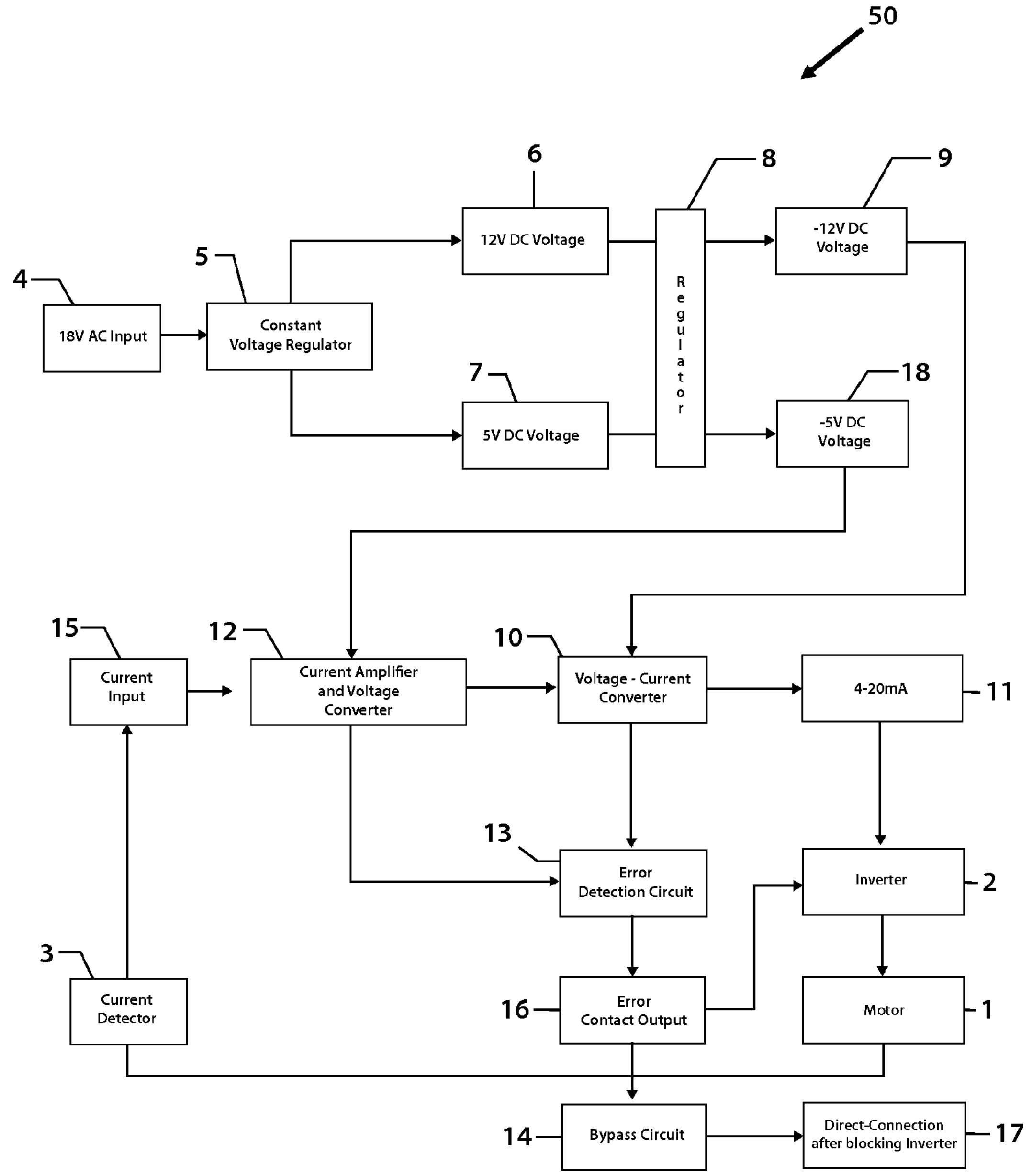
FIG. 2 is a block diagram of one embodiment of a regression device circuit of the electric power saving device.

FIG. 2 is a block diagram of one embodiment of a regression device circuit of the electric power saving device for pump jacks and pump jack systems. As shown in FIG. 2, one embodiment of the regression device circuit 50 may comprise: a motor 1, inverter 2, current detector 3, an input voltage or 18V AC input 4, constant voltage regulator 5, 12V DC 6, 5V DC 7, regulator 8, −12V DC 9, voltage-current converter 10, 4-20 mA output current 11, current amplifier and voltage converter 12, error detection circuit 13, bypass circuit 14, input current 15, error contact output 16, inverter blocking circuit 17, and −5V DC 18. FIG. 2 shows that the input voltage or 18V AC input 4 is preferably supplied to the constant voltage regulator 5 and is preferably separated into 12V DC 6 and 5V DC 7. The 12V DC 6 and 5V DC 7 may then be inputted into a regulator 8 that preferably converts those voltages to negative voltage such as −12V DC 9 and −5V DC 18. Specifically, the 12V DC 6 is preferably converted to a negative electrical potential of −12V DC 9 and is preferably supplied into a voltage-current converter 10. A portion of the −12V DC 9 may also be inputted into the inverter 2 through a 4-20 mA output current 11 to operate the motor 1 which is preferably an induction electric motor) by preferably using the voltage in a variable voltage variable frequency (VVVF) function. In the event of a fault or abnormality in the current amplifier and voltage converter 12 and voltage-current converter 10, the error detection circuit 13 may operate a bypass circuit 14 in order to block the VVVF function of the inverter 2 and may directly connect the power supply of the pump jack 200 to the motor 1. After restoring back to normal operation, current from the motor 1 may be detected by the current detector 3 and inputted into the current amplifier and voltage converter 12 and voltage-current converter 10 via an input current 15. On the other hand, if an error is detected in the current amplifier and voltage converter 12 and or voltage-current converter 10, some current may be inputted into the bypass circuit 14 from the error contact output 16 through the error detection circuit 13 and may input directly into the motor 1 through the inverter blocking circuit 17 that directly supplies power. This structure also preferably converts and circulates the 5V DC 7 to become −5V DC 18 through the regulator 8 and generally provides −5V DC 18 as power to the current amplifier and voltage converter 12. Some current of the −5V DC 18 may also be inputted into the inverter 2 through the 4-20 mA output current 11. After running the inverter 2, the current detected from current detector 3 may be applied to the current amplifier and voltage converter 12 through input current 15, and again changed to the voltage-current converter 10.

Figure 3:
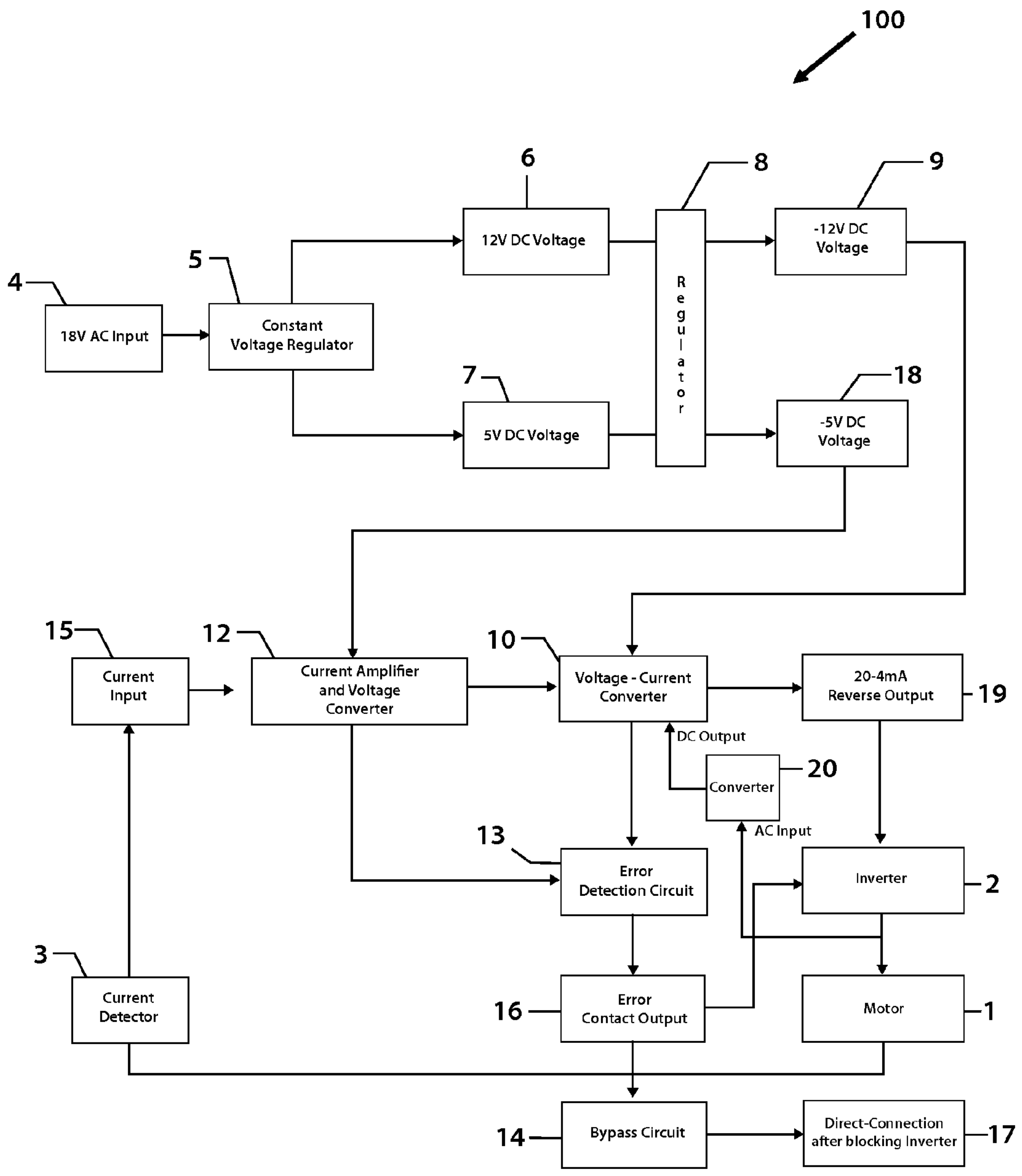
FIG. 3 is a block diagram of one embodiment of the electric power saving device for pump jacks and pump jack systems.

FIG. 3 is a block diagram of one embodiment of the electric power saving device for pump jacks and pump jack systems. As shown in FIG. 3, one embodiment of the electric power saving device 100 may comprise: a motor 1, inverter 2, current detector 3, an input voltage or 18V AC input 4, constant voltage regulator 5, 12V DC 6, 5V DC 7, regulator 8, −12V DC 9, voltage-current converter 10, current amplifier and voltage converter 12, error detection circuit 13, bypass circuit 14, input current 15, error contact output 16, inverter blocking circuit 17, −5V DC 18, 20-4 mA reverse output current 19, and converter 20. Some features of the electric power saving device 100 may have been modified by having been connected and installed to the regression device circuit 50 of Korean Patent No. 10-0862579 that has such structure. FIG. 3 shows that the electric power saving device 100 generally comprises a structure that preferably detects current from the current detector 3 and preferably passes the current through the current amplifier and voltage converter 12 without converting to 4-20 mA DC output in the voltage-current converter 10. Rather, the input current 15 is preferably converted by a reversed output current of 20-4 mA reverse output current 19 and preferably inputted into the inverter 2. While the step from the input current 15 above is substantially the same up to the current amplifier and voltage converter 12, the 4-20 mA output current 11 in the regression device circuit 50 in the voltage-current converter 10 preferably has been converted to a reverse output current to approximately 20-4 mA from the 20-4 mA reverse output current 19 in the electric power saving device 100. Additionally, as shown in FIG. 3, output value of the current detector 3, which may be approximately between 0-5 A, and the inverter 2 output frequency may have opposite values, in cases where the output is close to approximately 4 mA through the voltage-current converter 10 in case of an up stroke (i.e., heavy-load) as shown in FIG. 4. Therefore, if the frequency of the inverter 2 decreases contrary to the down stroke (or unload), an input current 15 value through the current detector 3 may likely decrease as the DC output value increases near 20 mA through the voltage-current converter 10, which typically results in a frequency increase for the inverter 2.

Figure 4A:
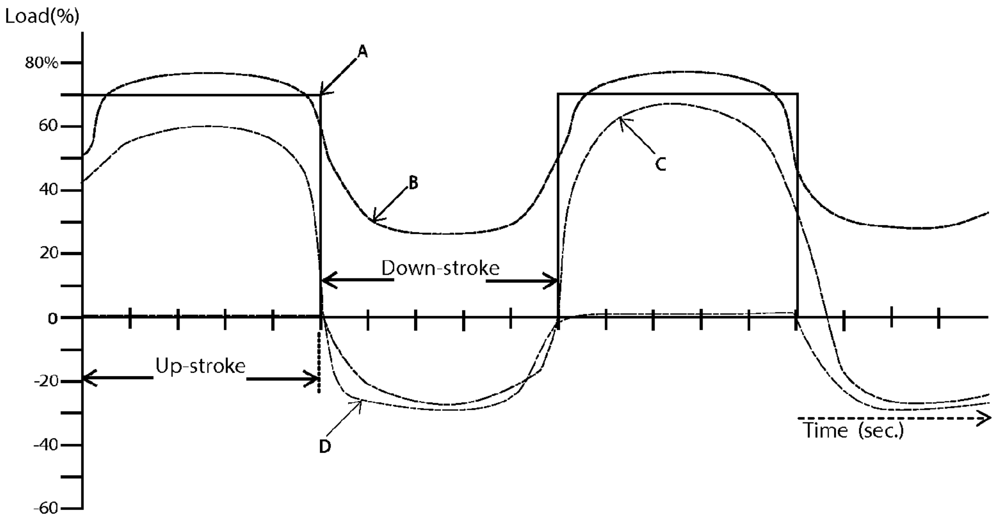
FIGS. 4*a* and 4*b* are graphs showing the comparison of the motor rotation, current, torque, and back-electromagnetic force between a standard pump jack and one embodiment of the pump jack with the electric saving device.
Figure 4B:
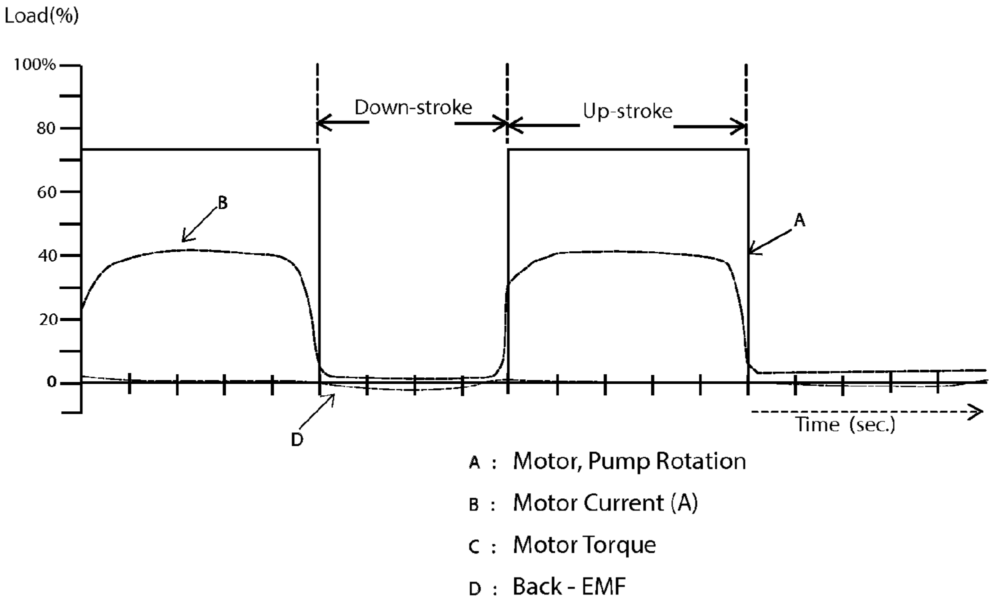

FIGS. 4*a* and 4*b* are graphs showing the comparison of the motor rotation, current, torque, and back-electromagnetic force between a standard pump jack and one embodiment of the pump jack with the electric saving device.

FIG. 5 is a table showing the comparison of the mechanical behavior between a conventional pump jack and an embodiment of the pump jack with the electric saving device. As shown in FIGS. 4*a*, 4*b*, and 5, the DC charging voltage of the inverter 2 may increase during the down stroke of the pump jack 200 due to the Back EMF resulting from the counter weight 270 of the pump jack 200. In the event that: (1) the charging voltage increase exceeds the rating of the DC of the converter 20 and (2) 0-2.5V output voltage is inputted into the voltage-current converter 10 through charging the converter 20, a 4-20 mA output 11 may be increased to the direction near approximately 20 mA to increase speed to a height that offsets Back EMF that is generated during down stroke or unload.

In other words, the converter 20 may comprise a "cross regulation of switch mode power supply" (not shown), which may further comprise the tracking mode and regulation mode, wherein the tracking mode may be positioned in the given target value to an actuator or devices connected to the actuator (i.e., the cross regulation of switch mode power supply applies to control for reaching the speed of the induction electric motor). The regulation mode, on the other hand, may correspond to precision control of the hunting phenomenon that is generated after arriving at the target value by the tracking mode. The input of the motor 1 or induction electric motor that is preferably the Back EMF generated by the counter weight 270 during download (or un-load) by detecting the output voltage of the inverter 2 may provide an AC voltage that may be detected in the converter 20 up to the limit of the capacity of the inverter 2. If the AC voltage is detected as being higher than the set limit, the output voltage of the direct current of 0-2.5V that passes through the converter 20 may be inputted into the voltage-current converter 10 and may increase to the direction near approximately 20 mA only when the value is preferably more than the set purpose value of the tracking mode—i.e., where the speed of the motor 1 or induction electric motor will also increase to minimize Back EMF.

Additionally, the characteristics of the electric power saving device 100 for the pump jack 200 may have a dual effect: (1) one that achieves an electric power saving effect by providing slow speed during the up stroke (i.e., heavy load) while the one SPM (single cycle) of the pump jack 200 is the same; and (2) the other, may be increasing oil production by reducing the amount of air bubbles in the hole pump 290 and bucket at the bottom of the polished rod 230.

FIG. 6 is an illustration of the output test data that was acquired when testing one embodiment of the pump jack with the electric power saving device. FIG. 6 also shows a comparison of the substantial electrical energy savings between a conventional pump jack and an embodiment of the pump jack with the electric saving device with a 3 phase alternating current configured at 460 volts, 60 hertz and 55 kilowatts.

FIG. 7 is another illustration of the output test data that was acquired when testing one embodiment of the pump jack with the electric power saving device. FIG. 7 also shows a comparison of the substantial electrical energy savings between a conventional pump jack and an embodiment of the pump jack with a 3 phase alternating current configured at 460 volts, 60 hertz and 30 kilowatts.

As described above, the present disclosure is not limited to the described embodiments and drawings attached and displacement, modification, and conversion without departing the scope of the technical idea and should be available and clear for a person having ordinary skill in the art. While the foregoing written description enables one of ordinary skill to make and use what is considered presently to be the best mode thereof, those of ordinary skill will understand and appreciate the existence of variations, combinations, and equivalents of the specific embodiment, method, and examples herein. This disclosure should therefore not be limited by the above described embodiment, method, and examples, but by all embodiments and methods within the scope and spirit of the disclosure as claimed.

The foregoing description of the preferred embodiment has been presented for the purposes of illustration and description. While multiple embodiments are disclosed, still other embodiments will become apparent to those skilled in the art from the above detailed description, which shows and describes illustrative embodiments. As will be realized, the embodiments are capable of modifications in various obvious aspects, all without departing from the spirit and scope. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope. It is intended that the scope not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. An electric power saving device for a motor of a pump jack apparatus, comprising:

a current detector;

a current amplifier and voltage converter;

a voltage-current converter; and an inverter;

wherein said current detector is coupled between a motor of a pump jack and said current amplifier and voltage converter;

wherein said current amplifier and voltage converter is coupled between said current detector and said voltage-current converter;

wherein said voltage-current converter is coupled between said current amplifier and voltage converter and said inverter;

wherein said inverter is coupled between said voltage-current converter and said motor of said pump jack; and wherein said electric power saving device reduces a speed of said motor during an up stroke of said pump jack and increases said speed of said motor during a down stroke of said pump jack based on a torque formula.

2. The electric power saving device of claim 1, comprising an error detection circuit;

wherein said error detection circuit is coupled to said current amplifier and voltage converter and said voltage-current converter and is configured to detect a fault in said current amplifier and voltage converter and said voltage-current converter;

wherein said fault occurs when said current amplifier and voltage converter does not function properly; and wherein said fault occurs when said voltage-current converter does not function properly.

3. The electric power saving device of claim 2, further comprising:

a bypass circuit;

wherein, when said error detection circuit detects said fault, said bypass circuit blocks an input current from said inverter to said motor and directly couples a power supply of said pump jack to said motor.

4. The electric power saving device of claim 2, wherein said error detection circuit is configured to detect an error in said current amplifier and voltage converter and said voltage-current converter; and wherein said error detection circuit couples said inverter to said motor and allows a portion of said input current to enter said motor.

5. The electric power saving device of claim 2, further comprising:

a constant voltage regulator; and a voltage regulator;

wherein said constant voltage regulator is coupled between an input voltage and said regulator; and wherein said regulator is coupled between said constant voltage regulator and said current amplifier and voltage converter.

6. The electric power saving device of claim 2, wherein said regulator is coupled between said constant voltage regulator and said voltage-current converter.

7. The electric power saving device of claim 6, wherein said input voltage is an AC voltage; and wherein said constant voltage regulator converts said AC voltage to a first DC voltage and a second DC voltage.

8. The electric power saving device of claim 7, wherein said regulator converts said first DC voltage to a first negative DC voltage; and wherein said first negative DC voltage is inputted to said current amplifier and voltage converter.

9. The electric power saving device of claim 7, wherein said regulator converts said second DC voltage to a second negative DC voltage; and wherein said second negative DC voltage is inputted to said voltage-current converter.

10. An electric power saving device for pump jacks and pump jack systems, comprising:

a current detector;

a current amplifier and voltage converter;

a voltage-current converter;

an inverter; and a converter;

wherein said current detector is coupled between a motor of a pump jack and said current amplifier and voltage converter;

wherein said current amplifier and voltage converter is coupled between said current detector and said voltage-current converter;

wherein said voltage-current converter is coupled between said current amplifier and voltage converter and said inverter;

wherein said inverter is coupled between said voltage-current converter and said motor of said pump jack;

wherein said converter is coupled between said inverter and said voltage-current converter; and wherein said electric power saving device reduces a speed of said motor during an up stroke of said pump jack and increases said speed of said motor during a down stroke of said pump jack based on a torque formula.

11. The electric power saving device of claim 10, comprising an error detection circuit;

wherein said error detection circuit is coupled to said current amplifier and voltage converter and said voltage-current converter and is configured to detect a fault in said current amplifier and voltage converter and said voltage-current converter;

wherein said fault occurs when said current amplifier and voltage converter does not function properly; and wherein said fault occurs when said voltage-current converter does not function properly.

12. The electric power saving device of claim 11, further comprising a bypass circuit;

wherein, when said error detection circuit detects said fault, said bypass circuit blocks an input current from said inverter to said motor and directly couples a power supply of said pump jack to said motor.

13. The electric power saving device of claim 11, wherein said error detection circuit is configured to detect an error in said current amplifier and voltage converter and said voltage-current converter; and wherein said error detection circuit couples said inverter to said motor and allows a portion of said input current to enter said motor.

14. The electric power saving device of claim 11, comprising:

a constant voltage regulator; and a voltage regulator;

wherein said constant voltage regulator is coupled between an input voltage and said regulator; and wherein said regulator is coupled between said constant voltage regulator and said current amplifier and voltage converter.

15. The electric power saving device of claim 11, wherein said regulator is coupled between said constant voltage regulator and said voltage-current converter.

16. The electric power saving device of claim 15, wherein said regulator converts said first DC voltage to a first negative DC voltage; and wherein said first negative DC voltage is inputted to said current amplifier and voltage converter.

17. The electric power saving device of claim 16, wherein said regulator converts said second DC voltage to a second negative DC voltage; and wherein said second negative DC voltage is inputted to said voltage-current converter.

18. An electric power saving device for pump jacks and pump jack systems, comprising:

a current detector;

a current amplifier and voltage converter;

a voltage-current converter;

an inverter;

an error detection circuit;

a bypass circuit;

a constant voltage regulator; and a voltage regulator;

wherein said current detector is coupled between a motor of a pump jack and said current amplifier and voltage converter;

wherein said current amplifier and voltage converter is coupled between said current detector and said voltage-current converter;

wherein said voltage-current converter is coupled between said current amplifier and voltage converter and said inverter;

wherein said inverter is coupled between said voltage-current converter and said motor of said pump jack;

wherein said error detection circuit is coupled to said current amplifier and voltage converter and said voltage-current converter and is configured to detect a fault in said current amplifier and voltage converter and said voltage-current converter;

wherein said fault occurs when said current amplifier and voltage converter does not function properly;

wherein said fault occurs when said voltage-current converter does not function properly;

wherein, when said error detection circuit detects said fault, said bypass circuit blocks an input current from said inverter to said motor and directly couples a power supply of said pump jack to said motor;

wherein said error detection circuit is configured to detect an error in said current amplifier and voltage converter and said voltage-current converter;

wherein said error detection circuit couples said inverter to said motor and allows a portion of said input current to enter said motor;

wherein said constant voltage regulator is coupled between an input voltage and said regulator;

wherein said regulator is coupled between said constant voltage regulator and said current amplifier and voltage converter;

wherein said regulator is coupled between said constant voltage regulator and said voltage-current converter;

wherein said input voltage is an AC voltage;

wherein said constant voltage regulator converts said AC voltage to a first DC voltage and a second DC voltage;

wherein said regulator converts said first DC voltage to a first negative DC voltage;

wherein said first negative DC voltage is inputted to said current amplifier and voltage converter;

wherein said regulator converts said second DC voltage to a second negative DC voltage;

wherein said second negative DC voltage is inputted to said voltage-current converter;

wherein a current output of said voltage-current converter is between approximately 4-20 mA; and wherein said electric power saving device reduces a speed of said motor during an up stroke of said pump jack and increases said speed of said motor during a down stroke of said pump jack based on a torque formula.

* * * * *